United States Patent
Hawes et al.

(10) Patent No.: US 12,081,140 B2
(45) Date of Patent: Sep. 3, 2024

(54) SWITCHING SYNCHRONIZATION FOR MODULAR MULTILEVEL CONVERTERS

(71) Applicant: GE Energy Power Conversion Technology Limited, Warwickshire (GB)

(72) Inventors: Nathaniel B. Hawes, Niskayuna, NY (US); Jovan Z. Bebic, Niskayuna, NY (US); Xiaohong Li, Niskayuna, NY (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 108 days.

(21) Appl. No.: 17/714,992

(22) Filed: Apr. 6, 2022

(65) Prior Publication Data

US 2023/0327574 A1    Oct. 12, 2023

(51) Int. Cl.
*H02M 7/483*    (2007.01)
*H02M 7/493*    (2007.01)

(52) U.S. Cl.
CPC .......... *H02M 7/4835* (2021.05); *H02M 7/493* (2013.01)

(58) Field of Classification Search
CPC .. H02M 1/0012; H02M 1/325; H02M 7/4835; H02M 7/49; H02M 7/493; H02M 7/497; H02J 1/102
See application file for complete search history.

(56) References Cited

U.S. PATENT DOCUMENTS

| | | | |
|---|---|---|---|
| 6,788,559 B2 | 9/2004 | Sheng et al. | |
| 7,109,691 B2 | 9/2006 | Brooks et al. | |
| 9,450,479 B2 | 9/2016 | Basic et al. | |
| 9,722,502 B2 | 8/2017 | Steimer | |
| 9,866,113 B1 | 1/2018 | Assaad et al. | |
| 10,778,115 B2 * | 9/2020 | Hayashi | H04L 12/28 |

(Continued)

FOREIGN PATENT DOCUMENTS

| | | |
|---|---|---|
| CN | 103904876 B | 1/2017 |
| CN | 107834867 B | 11/2018 |

(Continued)

OTHER PUBLICATIONS

Ilves et al. "A Submodule Implementation for Parallel Connection of Capacitors in Modular Multilevel Converters," 2013 15th European Conference on Power Electronics and Applications (EPE), 2013, pp. 1-10, doi: 10.1109/EPE.2013.6634325.

(Continued)

*Primary Examiner* — Fred E Finch, III
(74) *Attorney, Agent, or Firm* — WOOD IP LLC

(57) ABSTRACT

Provided is a modular multilevel converter and a method for synchronizing outputs of sub-modules of the converter. The modular multilevel converter includes sub-modules connected in parallel, and each sub-module generates an output. The modular multilevel converter also includes a controller that is communicatively coupled to the sub-modules. The controller controls a flow of one or more synchronizing signals between the plurality of sub-modules, such that each sub-module receives the synchronizing signals in opposite directions simultaneously, thereby controlling a synchronization of the outputs generated by the sub-modules.

10 Claims, 11 Drawing Sheets

(56) References Cited

U.S. PATENT DOCUMENTS

| | | | | |
|---|---|---|---|---|
| 2009/0290393 | A1* | 11/2009 | Angerer | H02M 7/493 |
| | | | | 710/316 |
| 2011/0267854 | A1* | 11/2011 | Flannery | H04L 12/437 |
| | | | | 363/72 |
| 2016/0247641 | A1* | 8/2016 | Malapelle | H01H 9/54 |
| 2019/0028038 | A1* | 1/2019 | Alvarez Valenzuela | |
| | | | | H04B 10/50 |

FOREIGN PATENT DOCUMENTS

| | | |
|---|---|---|
| DE | 19917354 A1 | 10/2000 |
| EP | 3059848 A1 | 8/2016 |

OTHER PUBLICATIONS

Martinez-Rodrigo et al. "Modular Multilevel Converters: Control and Applications," Energies, vol. 10, No. 1709, Oct. 26, 2017, pp. 1-26, doi: 10.3390/en10111709.

Azidehak et al. "Control and synchronization of distributed controllers in modular converters," IECON 2014-40th Annual Conference of the IEEE Industrial Electronics Society, IEEE, Oct. 29, 2014 (Oct. 29, 2014), pp. 3644-3650, XP032739804, DOI: 10.1109/IECON.2014.7049041.

European Search Report for EP Application No. 23165808.9 dated Aug. 2, 2023, 7 pages.

\* cited by examiner

SWITCHING SYNCHRONIZATION FOR MODULAR MULTILEVEL CONVERTERS

GOVERNMENT RIGHTS IN THIS DISCLOSURE

This disclosure was made with U.S. government support under contract number DE-EE0007252. The U.S. government has certain rights in this invention.

I. TECHNICAL FIELD

The technical field relates generally to a modular multilevel converter. In particular, a modular multilevel converter having a plurality of sub-modules directly connected in a parallel configuration and a method of synchronization of the sub-modules.

II. BACKGROUND

Converters are used for many different applications, for example, for coupling electrical grids and variable-speed drives, photovoltaic and wind power plants, pumped storage power stations, and for energy exchange between two electrical grids.

There are different types of converters used in the many different applications. For example, conventional modular multilevel converter (MMC) 100 as shown in FIG. 1, includes sub-modules 40 (40*a*, 40*b*, 40*c*, 40*e*, 40*f*) connected to each other in a series configuration. In addition, sub-modules 40 (40*a*, 40*b*, 40*c*, 40*e*, 40*f*) are communicatively coupled to system control 170 via sub-module communication bus 180.

FIGS. 2A and 2B show two types of sub-modules 40, 50 that can be incorporated into MMC 100. In these configurations, the input terminals 2*a*, 2*b*, 12*a*, and 12*b* of sub-modules 40, 50 are not used and are instead connected to each other via output terminals 22, 32, sensors 30A, 30B, which sense the operating conditions of MMC 100 and a local control unit (e.g., local controllers 6, 16) which coordinates the operation of the sub-modules. These sub-modules 40, 50 are typical half or full bridge circuits that include power electronic switches 8*a*, 8*b* and 18*a-d*, energy storage components (e.g., capacitors 4, 14 and inductors 10, 20) and gate drivers which operate power electronic switches 8*a*, 8*b* and 18*a-d*).

In order to increase the power of MMCs, each sub-module may be comprised of several sub-modules arranged in a "soft parallel" configuration. A soft-parallel configuration refers to the sub-modules being connected in parallel with an intermediary inductor between them, forcing equal current sharing amongst the sub-modules. However, a soft-parallel configuration results in increased costs, a higher likelihood of failure between the sub-modules, and takes up space due to the inclusion of the intermediary components.

To solve the above-mentioned problems, it is desirable to have a system configured to provide a direct connection between the sub-modules while synchronizing the output of multiple sub-modules during operation.

III. SUMMARY OF THE EMBODIMENTS

The embodiments of the present disclosure provide a modular multilevel converter having a plurality of sub-modules directly connected to each other in a hard parallel configuration without any impedance between them and a method of synchronization of the sub-modules.

In one exemplary embodiment, a modular multilevel converter is provided. The modular multilevel converter includes sub-modules connected in parallel, and each sub-module is configured to generate an output. The modular multilevel converter also includes a controller that is communicatively coupled to the sub-modules. The controller controls a flow of one or more synchronizing signals between the plurality of sub-modules, such that each sub-module receives one or more synchronizing signals in opposite directions simultaneously, thereby controlling a synchronization of the outputs generated by the sub-modules.

In another exemplary embodiment, a method for synchronizing the outputs generated by sub-modules via a controller of the above-mentioned modular multilevel converter is provided.

In yet another exemplary embodiment, a controller implementing the above-mentioned method is also provided.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 3:
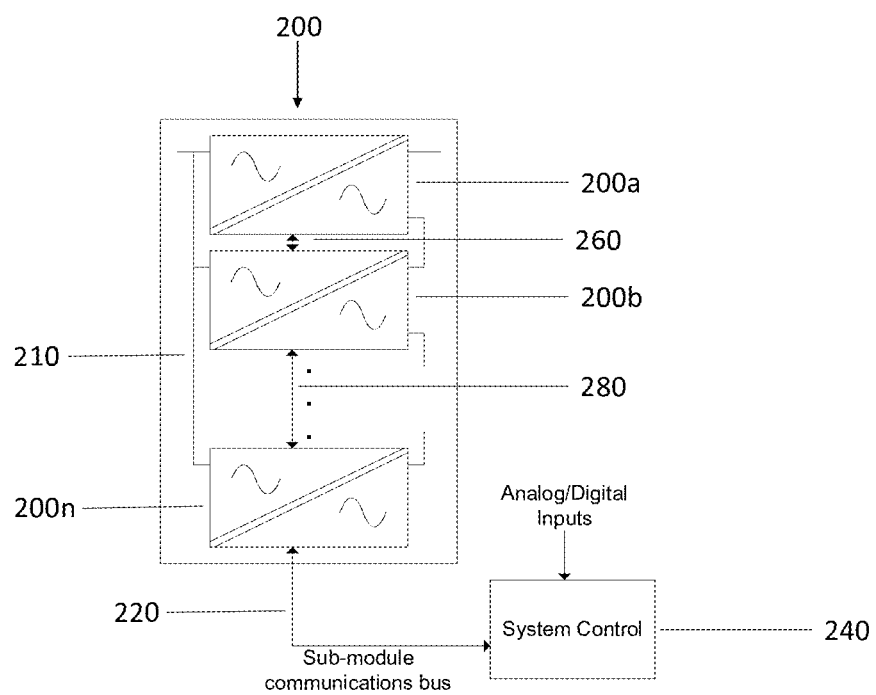
FIG. 3 is an example of a modular multilevel converter (MMC) according to one or more exemplary embodiments of the present invention.
Figure 7:
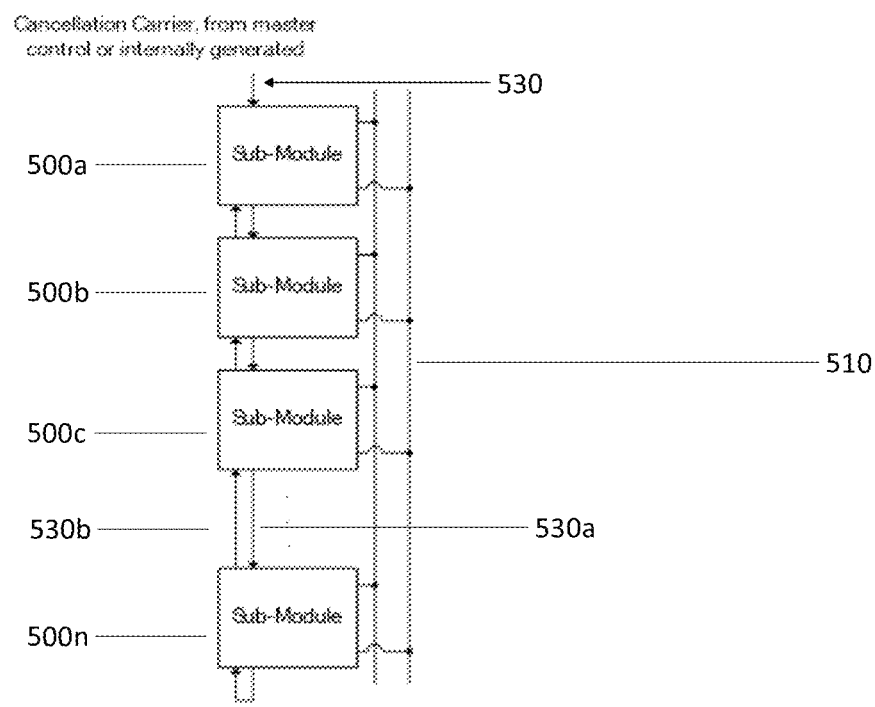
FIG. 7 is an example of the generation of synchronization signals between the sub-modules of FIG. 3 according to one or more exemplary embodiments of the present invention.
Figure 8:
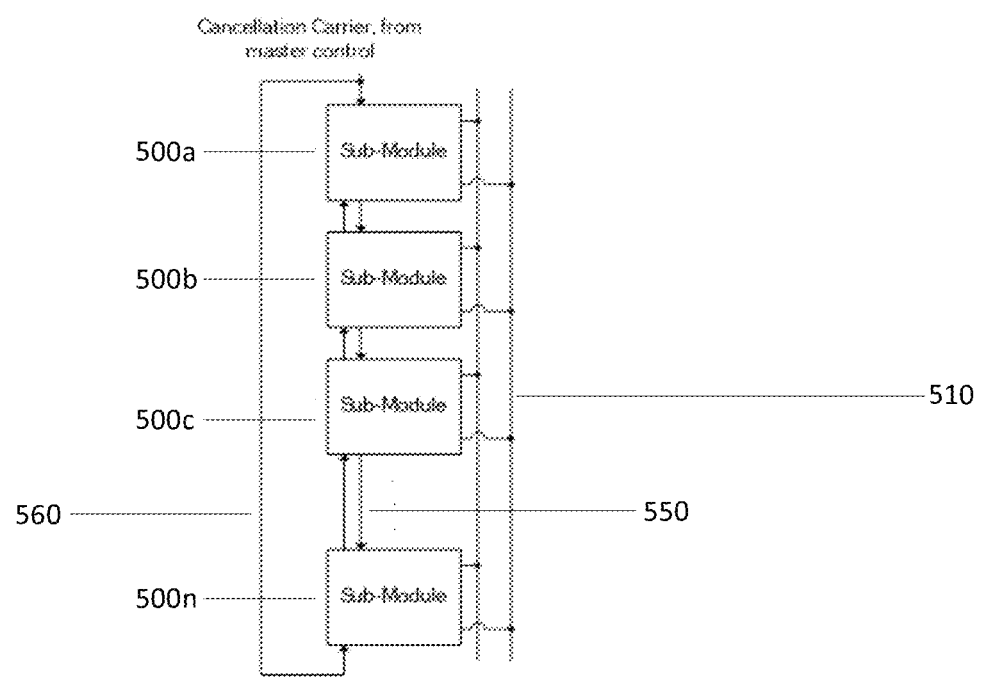
FIG. 8 is another example of the generation of synchronization signals between the sub-modules of FIG. 3 according to one or more exemplary embodiments of the present invention.
Figure 9:
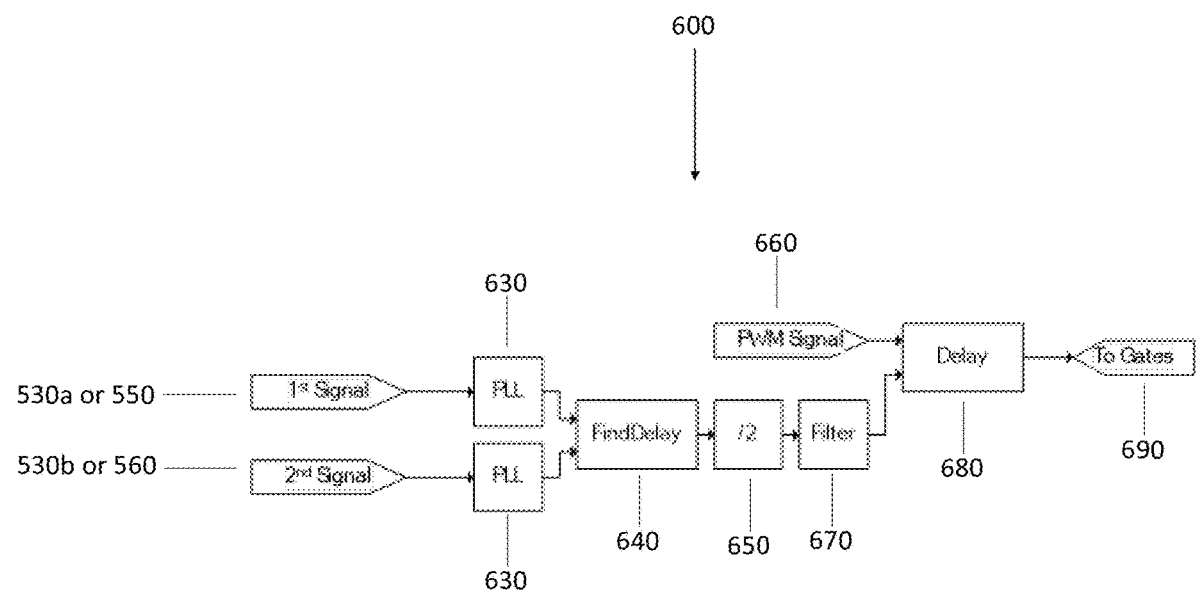

FIG. 9 is a block diagram illustrating an algorithm being performed by system controller 240 for aligning (e.g., synchronizing) the switching of paralleled sub-modules 200*a*, 200*b* and 200*n* of FIG. 3 with daisy-chained synchronization signal 530 (530*a*, 530*b*) as shown in FIG. 7 or with synchronization signals 550, 560 as shown in FIG. 8.

Figure 10:
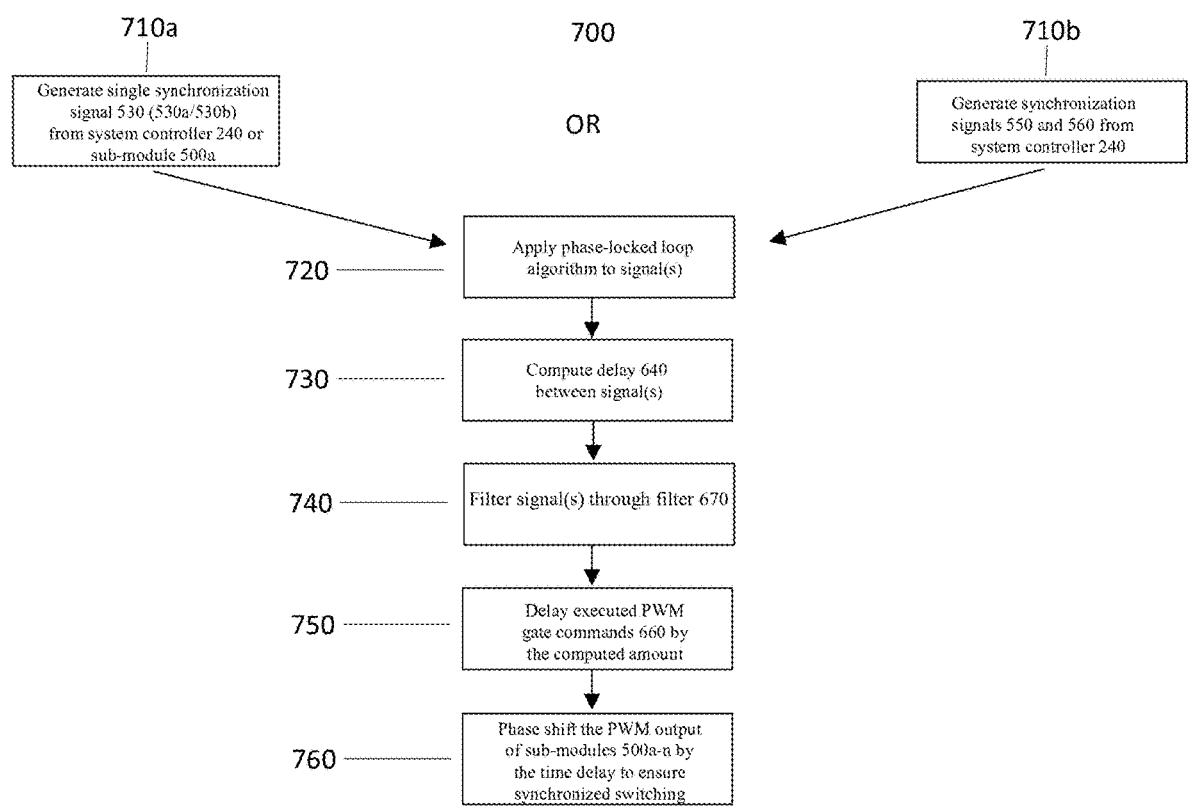

FIG. 10 is a flow chart illustrating the synchronization method implementing the algorithm of FIG. 9 to be performed by the modular multilevel converter of FIG. 3 according to one or more exemplary embodiments of the present invention.

Figure 11:
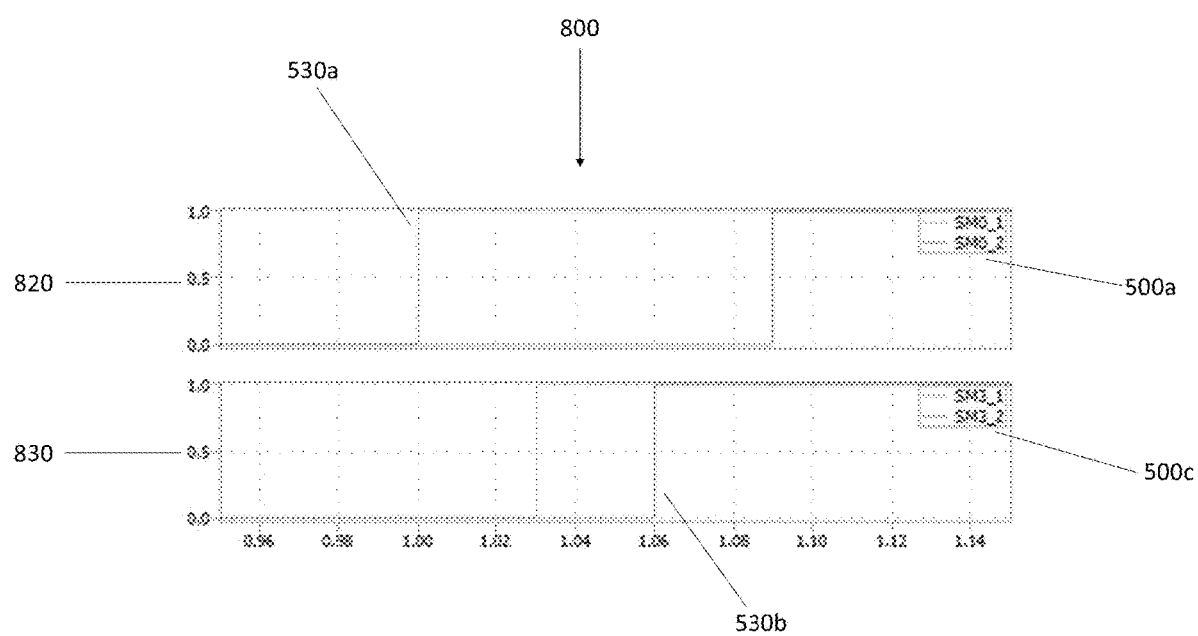

FIG. 11 is a graph illustrating a comparison between the synchronization signals of the sub-modules of FIG. 7 according to one or more exemplary embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide a modular multilevel converter (MMC) including a system controller and method of operating the MMC permitting hard-paralleling of a plurality of power electronic sub-modules. There are many different control architectures for such converters, but typically there are at least two levels, a system level controller which orchestrates high-level control objectives (power regulation, voltage regulation, etc.) and a local level controller which implements switching functions and may regulate local system parameters (e.g., local capacitor voltages). Typically, the system controller will communicate desired overall voltage or modulation commands to the local controllers, and the local controllers will provide status and measurement feedbacks to the system level controller. The system controller relies upon local sub-module controllers communicating and anticipating the delays of each other, then pre-compensating their outputs, to thereby synchronize their outputs. It should also be noted that while much of the invention is being described herein as applied to MMC type converters, embodiments of the invention are also applicable to any power electronic converter which has multiple paralleled output channels.

FIG. 3 is an example of a modular multilevel converter (MMC) according to one or more exemplary embodiments of the present invention. In this configuration, sub-modules 200a, 200b, 200n are directly connected in a hard parallel configuration to common bus 210. Sub-module local controllers communicate with system controller 240 via sub-module communication bus 220. The sub-modules receive general operating commands from system controller 240 and in turn report their status and pertinent information back to system controller 240. It should be noted that each sub-module 200a, 200b, 200n shown here may be a parallel combination of several sub-modules.

Additional details regarding a modular multilevel converter according to the invention will now be described with reference to FIG. 4.

Figure 4:
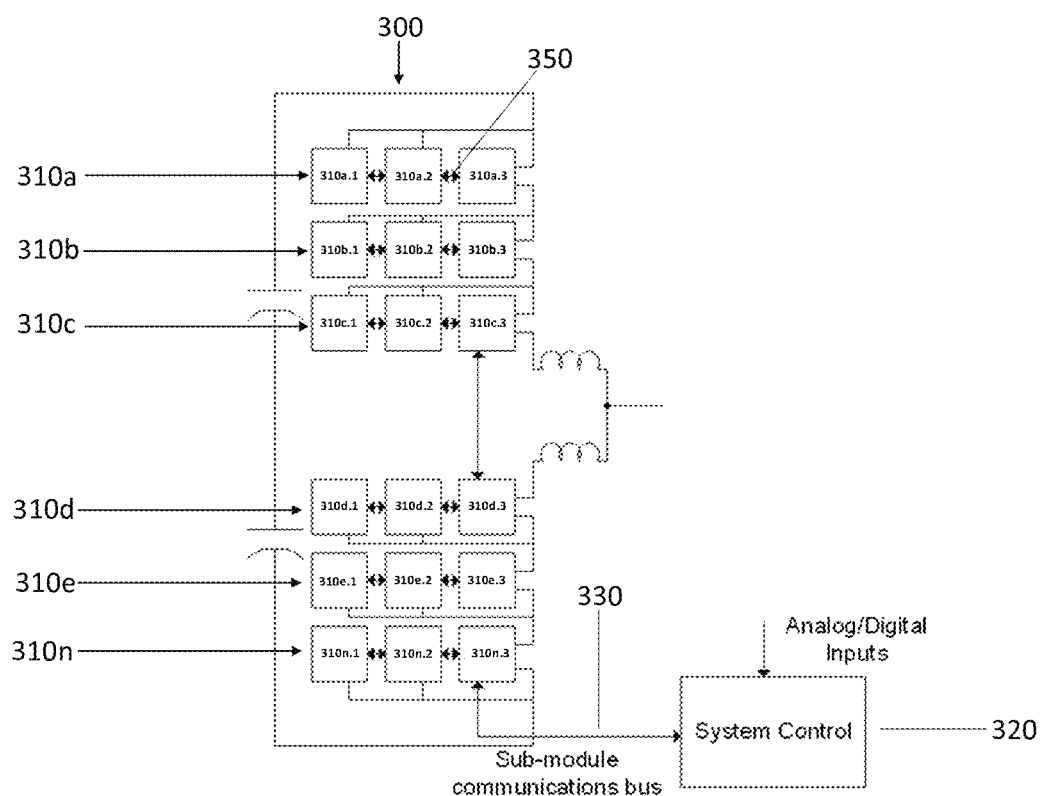
FIG. 4 is a detailed view of a modular multilevel converter (MMC) according to one or more exemplary embodiments of the present invention.

FIG. 4 is a detailed view of a modular multilevel converter (MMC) according to one or more exemplary embodiments of the present invention. In this configuration, sub-modules 310a, 310b, 310c, 310d, 310e, 310n are directly connected in a hard parallel configuration within MMC 300. In addition, sub-modules 310a, 310b, 310c, 310d, 310e, 310n are communicatively coupled to system controller 320 via sub-module communication bus 330. Each sub-module 310a, 310b, 310c, 310d, 310e, 310n may be a hard parallel combination of several sub-modules as shown in MMC 300. For example, sub-module 310a may include sub-modules 310a.1, 310a.2, and 310a.3, which are also connected in a hard parallel configuration, as represented by double arrow 350, and so forth.

Additional details regarding the system controller 240 of modular multilevel converter 200 of FIG. 3 will now be described with reference to FIG. 5.

Figure 5:
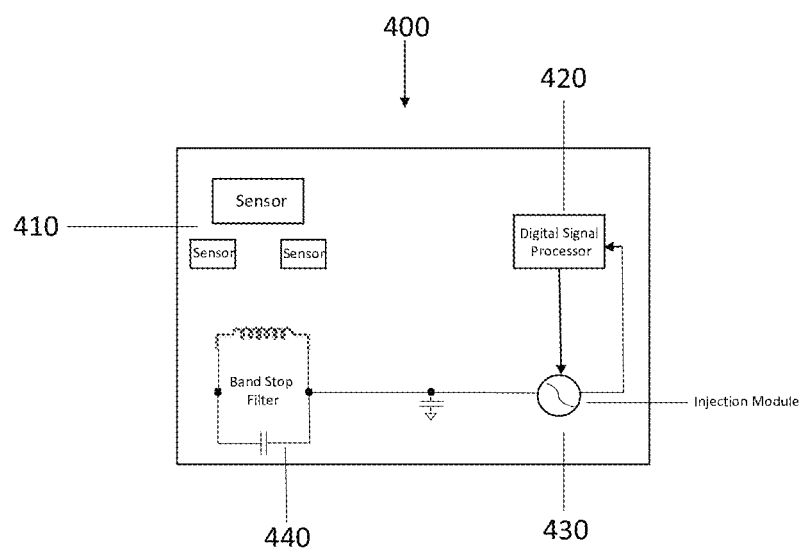
FIG. 5 is an example of a system controller 400 that may be used as the system controller 240 in the modular multilevel converter (MMC) of FIG. 3 according to one or more exemplary embodiments of the present invention.

FIG. 5 is an example of a system controller 400 that may be used as the system controller 240 in the modular multilevel converter (MMC) of FIG. 3 according to one or more exemplary embodiments of the present invention.

System controller 400 may include one or more voltage sensors 410 which sense the operating conditions of MMC 200, for example. In certain embodiments, the system controller 400 may further include a digital signal processor 420, signal injection module 430, and band stop filter 440 associated with signal injection module 430. Digital signal processor 420 serves as a signal interface module which receives electrical signals associated with an operating condition of the one or more voltage sensors 410. In this configuration, system controller 400 can communicate desired voltage and modulation commands to the sub-module local controllers based on the operating conditions sensed by the one or more voltage sensors 410, and the sub-module local controllers will then provide status feedback to system controller 400.

Figure 6:
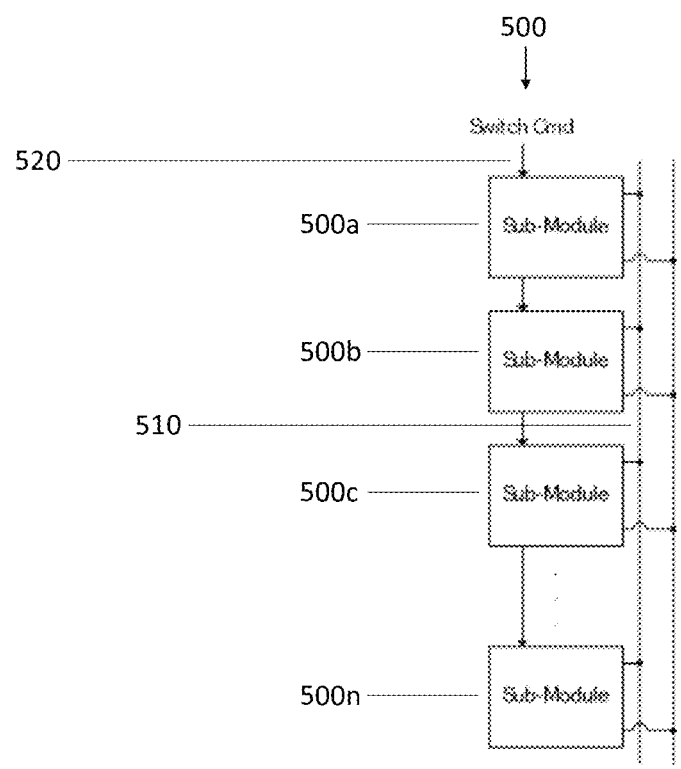
FIG. 6 is an example of a sub-module arrangement that can be implemented within the modular multilevel converter (MMC) of FIG. 3 performing a daisy-chain switching operation according to one or more exemplary embodiments of the present invention.

FIG. 6 is an example of a sub-module arrangement that can be implemented within the modular multilevel converter (MMC) of FIG. 3, performing daisy-chained switching commands according to one or more exemplary embodiments of the present invention.

As shown in FIG. 6, sub-modules 500a, 500b, 500c, 500n are directly connected in a parallel configuration to common bus 510. In addition, sub-modules 500a, 500b, 500c, 500n are configured to receive a single switching command 520, which is generated by either a sub-module local controller (not shown) or by system controller 240 (also referred to as "controller") and distributed to the power electronic switches of sub-modules 500a, 500b, 500c, 500n in a simple-daisy chain fashion. Switching command 520 can either be in a conducting state in which current is allowed to flow through the power electronic switches of sub-modules 500a, 500b, 500c, 500n, or they can be in a blocking state where current is not allowed to flow through the power electronic switches of sub-modules 500a, 500b, 500c, 500n. Thus, switching command 520 is what determines how sub-modules 500a, 500b, 500c, 500n should turn on/off their power electronic switches.

FIG. 7 is an example of the generation of synchronization signals between the sub-modules of FIG. 3 according to one or more exemplary embodiments of the present invention.

According to FIG. 7, a single synchronization signal 530 (530a, 530b), illustrated as a first synchronization signal ($1^{st}$) 530a (in one direction) and a second synchronization signal ($2^{nd}$) 530b (in the opposite direction) for explanation purposes only, herein is provided. According to an embodiment, the synchronization signal 530, known as a cancellation carrier signal, is generated internally from sub-module 500a or from system controller 240, and propagates in a daisy-chain fashion in a first direction (at 530a) to sub-modules 500a, 500b, 500c and 500n, respectively. This is followed by a propagation of the synchronization signal 530 in a daisy-chain fashion in a second direction opposite the first direction (at 530b) to sub-modules 500n, 500c, 500b, and 500a, respectively. As a result, sub-modules 500a, 500b, 500c and 500n each receive the synchronization signal 530 (530a, 530b) simultaneously in two directions.

FIG. 8 is another example of the generation of synchronization signals between the sub-modules of FIG. 3 according to one or more exemplary embodiments of the present invention.

As shown in FIG. 8, two separate synchronization signals 550, 560 propagate in opposite directions. In this case, synchronization signal 550 is generated from system controller 240 (as depicted in FIG. 3) and propagates in a daisy-chain fashion in one direction to sub-modules 500a, 500b, 500c and 500n which are connected via the common bus 510, respectively.

Further, synchronization signal 560 is also generated from system controller 240 but propagates directly to sub-module 500n. From sub-module 500n, the synchronization signal 560 then propagates in a daisy-chain fashion in the opposite direction of the synchronization signal 550, into sub-modules 500c, 500b and 500a, respectively. As a result, sub-modules 500a, 500b, 500c, 500n each receives both the synchronization signals 550 and 560 simultaneously, one incoming from a first direction and one incoming from a second direction opposite the first direction.

FIG. 9 is a block diagram illustrating an algorithm being performed by system controller 240 for aligning (e.g., synchronizing) the switching of paralleled sub-modules 200a, 200b and 200n of FIG. 3 with daisy-chained synchronization signal 530 (530a, 530b) as shown in FIG. 7 or with daisy-chained synchronization signals 550, 560 as shown in FIG. 8.

Figure 1:
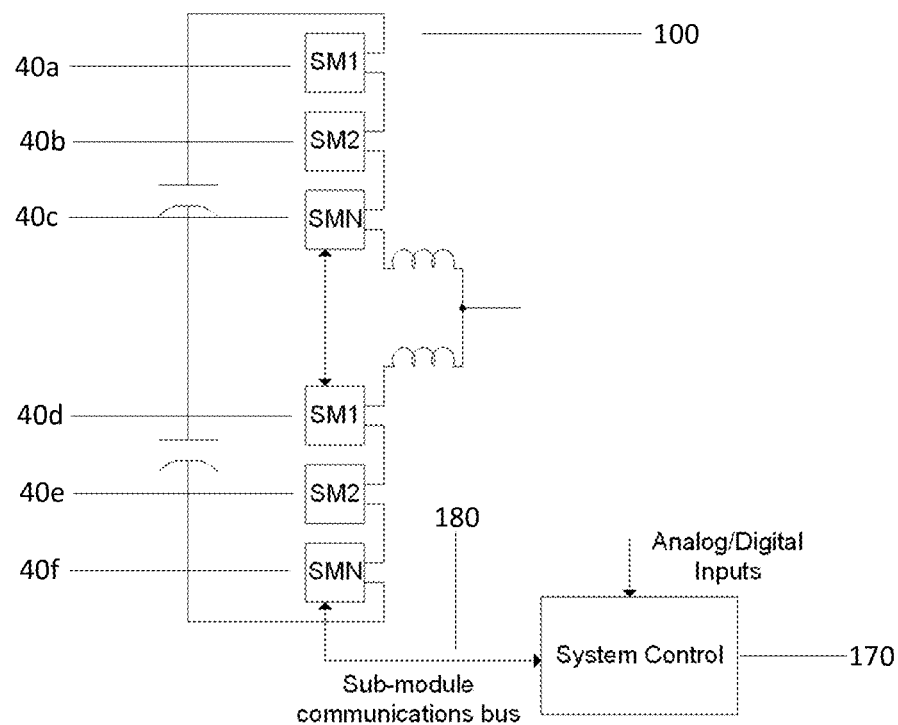
FIG. 1 is an example of a modular multilevel converter (MMC) according to the prior art.
Figures 2A, 2B:
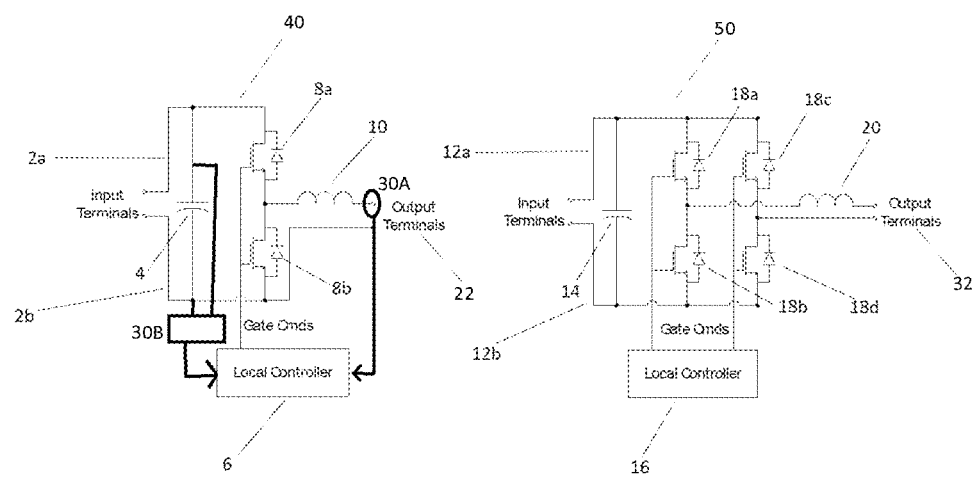
FIGS. 2A and 2B are examples of sub-modules which are used in modular multilevel converter (MMC) converters according to the prior art.

According to algorithm 600, a synchronization signal 530 (530a, 530b) is generated either internally from sub-module 500a or from system controller 240 (as depicted in FIG. 7). As noted earlier, synchronization signal 530 is illustrated as a first synchronization signal ($1^{st}$) 530a (in one direction) and a second synchronization signal ($2^{nd}$) 530b (in the opposite direction). Alternatively, a first synchronization ($1^{st}$) signal 550 and a second synchronization signal ($2^{nd}$) 560 are generated from system controller 240 (as depicted in FIG. 8). The synchronization signals may be analog voltage/current signals or simple single-bit digital low/high signals. These signals are propagated and read by each sub-module local controller as signals 1 and 2. These signals may optionally be locked onto using phase-locked loop algorithm 630 (PLL) to improve noise cancellation. A delay 640 between first synchronization signal 530a or 550 and the second synchronization signal 530b or 560 is then computed, divided by two, and optionally filtered through a filter 670 to generate a desired time delay. The executed pulse-width modulation (PWM) gate commands 660 are then delayed via delay step 680 by the computed amount. The PWM gate commands dictate how switching devices like those shown in FIG. 1 (8a-b/18a-d), for example, operate. The local controller of each sub-module 500a-n then phase shifts it's PWM output by the desired time delay which ensures that all sub-modules switch synchronously.

FIG. 10 is a flow chart illustrating a synchronization method implementing the algorithm of FIG. 9 to be performed by the modular multilevel converter of FIG. 3 according to one or more exemplary embodiments of the present invention.

At step 710a, single synchronization signal 530 is either generated from system controller 240 or internally from sub-module 500a, as shown in FIG. 7. As noted earlier, synchronization signal 530 is illustrated as a first synchronization signal ($1^{st}$) 530a (in one direction) and a second synchronization signal ($2^{nd}$) 530b (in the opposite direction). Alternatively, step 710b may be employed, in which synchronization signals 550 and 560 are both generated from system controller 240 in opposite directions, as shown in FIG. 8. At step 720, a phase-locked loop is applied to synchronization signal 530 (530a, 530b) or synchronization signals 550, 560, to lock on to the phase of synchronization signal 530 (530a, 530b) or synchronization signals 550, 560. At step 730, a delay is computed between synchronization signal 530 flowing in one direction (530a) and synchronization signal 530 flowing in the opposite direction (530b), or between synchronization signals 550, 560. Synchronization signals 530a and 530b or 550 and 560 are then filtered through filter 570 at step 740. At step 750, executed PWM gate commands 660 are delayed by the amount computed in step 730, as shown in FIG. 8. Finally, at step 760, the PWM output of sub-modules 500a-n are phase shifted by the time delay determined in step 750 to ensure synchronized switching of the sub-modules.

FIG. 11 is a graph illustrating a comparison between the synchronization signals of the sub-modules of FIG. 7 according to one or more exemplary embodiments of the present invention.

According to FIG. 11, plots 820, 830 depict the rising edge of the synchronization signals 530 (530a, 530b) of sub-modules 500a and 500c (depicted in FIG. 7), respectively. Single synchronization signal 530, including 530a and 530b, is generated, wherein synchronization signal 530a arrives first to sub-module 500a at t=1, and then to sub-module 500c at t=1.03. Then, the synchronization signal 530b returns and arrives first at sub-module 500c at t=1.06 and finally arrives at sub-module 500a last at t=1.09. In the event that both sub-modules were to begin a switching event at the average of the two synchronization signals 530a, 530b (at a desired time delay t=1.045, for example), their outputs would be synchronized.

The modular multilevel converter and the method performed according to the embodiments of the present invention permit arranging an infinite number of power electronic sub-modules in direct connection with each other, while providing a controller that relies on local sub-module controllers that can communicate and anticipate the delays of the sub-modules, thereby pre-compensating and synchronizing their outputs.

This written description uses examples to disclose the invention, including the best mode, and also to enable any person skilled in the art to practice the invention, including making and using any devices or systems and performing any incorporated methods.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power converter comprising:
   a plurality of sub-modules connected in parallel, each sub-module being configured to generate an output; and
   a controller (i) communicatively coupled to the plurality of sub-modules and (ii) configured to control a flow of one or more synchronizing signals between the plurality of sub-modules, wherein each sub-module of the plurality of sub-modules receives the one or more synchronizing signals in a first direction and in a second direction opposite the first direction via a switching command being (i) generated by the controller and (ii) distributed to each sub-module of the plurality of sub-modules in a daisy-chain operation;
   wherein upon distributing the switching command, the controller is further configured to: (i) control a flow of a first synchronizing signal of the one or more synchronizing signals to each sub-module of the plurality of sub-modules in the first direction, and (ii) simultaneously control a flow of a second synchronizing signal to each sub-module of the plurality of sub-modules in the second direction (iii) compute a delay in a flow time between the flow of the first synchronizing signal of the one or more synchronizing signals and the flow of the second synchronizing signal of the one or more synchronizing signals and (iv) delay a pulse-width modulation gate command corresponding to each sub-module of the plurality of sub-modules based on the computed delay, thereby synchronizing the outputs generated by the plurality of sub-modules.

2. The power converter of claim 1, wherein the plurality of sub-modules are directly connected to each other.

3. The power converter of claim 1, wherein the controller is computer, microchip, digital signal processor (DSP), or micro-controller.

4. The power converter of claim 1, wherein a sub-module of the plurality of sub-modules is further configured to generate the one or more synchronizing signals.

5. The power converter of claim 1, wherein the controller is further configured to generate the one or more synchronizing signals.

6. A power converter comprising:
   a plurality of sub-modules connected in parallel, each sub-module being configured to generate an output; and
   a controller (i) communicatively coupled to the plurality of sub-modules and (ii) configured to control a flow of one or more synchronizing signals between the plurality of sub-modules, wherein each sub-module of the plurality of sub-modules receives the one or more synchronizing signals in a first direction and in a second direction opposite the first direction via a switching command being (i) generated by the controller and (ii) distributed to each sub-module of the plurality of sub-modules in a daisy-chain operation;
   wherein, upon distributing the switching command, the controller is further configured to (i) control a flow of a first synchronizing signal of the one or more synchronizing signals to each sub-module of the plurality of sub-modules in the first direction; and (ii) simultaneously direct the flow of the first synchronizing signal of the one or more synchronizing signals to each sub-module of the plurality of sub-modules in the second direction opposite the first direction (iii) compute a delay in a flow time between the flow of the first synchronizing signal in the first direction and the flow of the first synchronizing signal in the second direction, and (ii) delay a pulse-width modulation gate command corresponding to each sub-module of the plurality of sub-modules based on the computed delay, thereby synchronizing the output generated by each submodule the plurality of sub-modules.

7. A method for synchronizing, via a controller, outputs generated by a plurality of sub-modules being connected in parallel, the method comprising:
   coupling the controller to the plurality of sub-modules;
   controlling, via the controller, a flow of one or more synchronizing signals between;
   receiving, at each sub-module of the plurality of sub-modules, one or more synchronizing signals in a first direction and in a second direction opposite the first direction;
   computing, via the controller, a delay in a flow time between a flow of a first synchronizing signal of the one or more synchronizing signals in the first direction and a flow of a second synchronizing signal of the one or more synchronizing signals in the second direction;
   delaying, via the controller, a pulse-width modulation gate command corresponding to each sub-module of the plurality of sub-modules based on the computed delay; and
   shifting, based on the computed delay, a phase of a pulse-width modulation output of each sub-module of the plurality of sub-modules such that each sub-module of the plurality of sub-modules receives the first synchronizing signal of the one or more synchronizing signals in the first direction and the second synchronizing signal of the one or more synchronizing signals in the second direction simultaneously, thereby synchronizing the outputs generated by each submodule of the plurality of sub-modules.

8. A method for synchronizing, via a controller, outputs generated by a plurality of sub-modules being connected in parallel, the method comprising:
   coupling the controller to the plurality of sub-modules;
   receiving, at each sub-module of the plurality of sub-modules, one or more synchronizing signals in a first direction and in a second direction opposite the first direction;
   computing, via the controller, a delay in a flow time between a flow of a first synchronizing signal of the one or more synchronizing signals in the first direction and a flow of the first synchronizing signal of the one or more synchronizing signals in the second direction;
   delaying, via the controller, a pulse-width modulation gate command corresponding to each sub-module of the plurality of sub-modules based on the computed delay; and
   shifting, based on the computed delay, a phase of a pulse-width modulation output of each sub-module of the plurality of sub-modules such that each sub-module of the plurality of sub-modules receives the first synchronizing signal of the one or more synchronizing signals in the first direction and the first synchronizing signal of the one or more synchronizing signals in the second direction simultaneously, thereby synchronizing the outputs generated by each submodule of the plurality of sub-modules.

9. A controller comprising:
one or more voltage sensors configured to sense a plurality of operating conditions of a power converter; and
a digital signal processor being (i) communicatively coupled to the one or more voltage sensors and (ii) configured to receive a plurality of electrical signals associated with an operating condition of the one or more voltage sensors;
wherein, the controller is communicatively coupled to a plurality of sub-modules, each sub-module being (i) arranged within the power converter (ii) connected in parallel, and (iii) configured to generate an output;
wherein each sub-module of the plurality of sub-modules receives one or more synchronizing signals in a first direction and in a second direction opposite the first direction;
wherein the controller is configured to control a flow of the one or more synchronizing signals between the plurality of sub-modules based on the plurality of operating conditions sensed by the one or more voltage sensors via a switching command being (i) generated by the controller and (ii) distributed to each sub-module of the plurality of sub-modules in a daisy-chain operation; and
wherein upon distributing the switching command, the controller is further configured to: (i) control a flow of a first synchronizing signal of the one or more synchronizing signals to each sub-module of the plurality of sub-modules in the first direction (ii) simultaneously control a flow of a second synchronizing signal to each sub-module of the plurality of sub-modules in the second direction (iii) compute a delay in a flow time between the flow of the first synchronizing signal of the one or more synchronizing signals and the flow of the second synchronizing signal of the one or more synchronizing signals and (iv) delay a pulse-width modulation gate command corresponding to each sub-module of the plurality of sub-modules based on the computed delay, thereby synchronizing the outputs generated by the plurality of sub-modules.

10. A controller comprising:
one or more voltage sensors configured to sense a plurality of operating conditions of a power converter; and
a digital signal processor being (i) communicatively coupled to the one or more voltage sensors and (ii) configured to receive a plurality of electrical signals associated with an operating condition of the one or more voltage sensors;
wherein, the controller is communicatively coupled to a plurality of sub-modules, each sub-module being (i) arranged within the power converter (ii) connected in parallel, and (iii) configured to generate an output;
wherein each sub-module of the plurality of sub-modules receives one or more synchronizing signals in a first direction and in a second direction opposite the first direction;
wherein the controller is configured to control a flow of the one or more synchronizing signals between the plurality of sub-modules based on the plurality of operating conditions sensed by the one or more voltage sensors via a switching command being (i) generated by the controller and (ii) distributed to each sub-module of the plurality of sub-modules in a daisy-chain operation;
wherein, upon distributing the switching command, the controller is further configured to (i) control a flow of a first synchronizing signal of the one or more synchronizing signals to each sub-module of the plurality of sub-modules in the first direction, and (ii) simultaneously direct the flow of the first synchronizing signal of the one or more synchronizing signals to each sub-module of the plurality of sub-modules in the second direction opposite the first direction (iii) compute a delay in a flow time between the flow of the first synchronizing signal of the one or more synchronizing signals in the first direction and the flow of the first synchronizing signal of the one or more synchronizing signals in the second direction; and (iv) delay a pulse-width modulation gate command corresponding to each sub-module of the plurality of sub-modules based on the computed delay, thereby synchronizing the output generated by each submodule of the plurality of sub-modules.

* * * * *